(12) United States Patent
Fang et al.

(10) Patent No.: US 11,534,863 B2
(45) Date of Patent: Dec. 27, 2022

(54) METHOD FOR ADHESIVE BONDING OF TITANIUM COMPONENTS USING A FIBER LASER SYSTEM

(71) Applicant: United Technologies Corporation, Farmington, CT (US)

(72) Inventors: Xiaomei Fang, Glastonbury, CT (US); John D. Riehl, Hebron, CT (US); Christopher J. Hertel, Wethersfield, CT (US); Dmitri Novikov, Avon, CT (US); Henry H. Thayer, Wethersfield, CT (US); Donald H. Spencer, Suffield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 771 days.

(21) Appl. No.: 16/253,958

(22) Filed: Jan. 22, 2019

(65) Prior Publication Data

US 2020/0230742 A1 Jul. 23, 2020

(51) Int. Cl.
| | |
|---|---|
| *B23K 26/20* | (2014.01) |
| *B23K 26/21* | (2014.01) |
| *B23K 26/32* | (2014.01) |
| *B23K 103/14* | (2006.01) |
| *F01D 5/14* | (2006.01) |
| *F01D 5/28* | (2006.01) |
| *F02K 3/04* | (2006.01) |

(52) U.S. Cl.
CPC .......... *B23K 26/21* (2015.10); *B23K 2103/14* (2018.08); *F01D 5/147* (2013.01); *F01D 5/28* (2013.01); *F02K 3/04* (2013.01); *F05D 2230/234* (2013.01); *F05D 2300/133* (2013.01)

(58) Field of Classification Search
CPC .... B23K 26/20–206; B23K 26/21–302; B23K 26/32–322; B23K 26/352–355; B23K 2103/14
See application file for complete search history.

(56) References Cited

U.S. PATENT DOCUMENTS

| | | | |
|---|---|---|---|
| 4,861,407 | A | 8/1989 | Volkmann et al. |
| 6,176,959 | B1 | 1/2001 | Clarke |
| 8,221,822 | B2 * | 7/2012 | Flanagan ............... B23K 26/34 427/2.24 |
| 8,987,632 | B2 | 3/2015 | Wohl, Jr. et al. |
| 9,458,728 | B2 | 10/2016 | Bruck et al. |

(Continued)

FOREIGN PATENT DOCUMENTS

JP 2016124024 A 7/2016

OTHER PUBLICATIONS

Zimmermann et al. "Improved Adhesion at Titanium Surfaces via Laser-Induced Surface Oxidation and Roughening", Materials Science and Engineering, vol. 558, Dec. 15, 2012, pp. 755-760.

(Continued)

*Primary Examiner* — Michael A Laflame, Jr.
(74) *Attorney, Agent, or Firm* — Getz Balich LLC

(57) ABSTRACT

A method for treating a surface of a contoured titanium substrate used for adhesively bonded engine components. The method including applying energy from a fiber laser system to a contoured surface of a titanium substrate, the laser energy is distributed to the contoured titanium surface by at least one of direct light of sight, reflection, or scattering of one or more laser beam.

20 Claims, 5 Drawing Sheets

(56) References Cited

U.S. PATENT DOCUMENTS

| | | | |
|---|---|---|---|
| 10,082,166 B2 | 9/2018 | Sabau et al. | |
| 2013/0197628 A1* | 8/2013 | Barcikowski | C08F 112/14 |
| | | | 623/1.49 |
| 2015/0151339 A1* | 6/2015 | Bruck | B23K 26/144 |
| | | | 134/4 |
| 2017/0210058 A1 | 7/2017 | Nishikawa et al. | |
| 2018/0056077 A1 | 3/2018 | Dadashian | |
| 2019/0366481 A1 | 12/2019 | Coulaud | |

OTHER PUBLICATIONS

EP search report for EP20153238.9 dated Sep. 11, 2020.

\* cited by examiner

METHOD FOR ADHESIVE BONDING OF TITANIUM COMPONENTS USING A FIBER LASER SYSTEM

BACKGROUND OF THE INVENTION

1. Technical Field

This invention relates in general to methods for surface preparation for bonding of a contoured titanium substrate for adhesive bonding, and in particular to methods for producing an oxide layer on a titanium substrate that enhances adhesive bonding of the titanium substrate.

2. Background Information

Bond performance of a structural adhesive joint requires a reliable and repeatable pre-bond surface structure. Traditionally, titanium substrates have been treated by processes such as a grit blast process, an alkaline etching process, and/or an acid or basic anodizing process to achieve a fresh oxide layer and a desirable surface roughness prior to bonding. However, the bond quality achievable from substrate surface subjected to a grit blast process is often inconsistent. As a result, the durability of the bond process may be inconsistent. Etching and anodizing processes are wet chemistry batch processes and require large quantity of hazard chemical solutions by immersion of entire parts.

A titanium substrate present within an environment containing oxygen (e.g., an "air" environment) will have an oxide layer formed on the surface of the substrate. Such an oxide layer is typically a solid layer, poorly bonded, and does not provide a desirable adhesive bonding surface.

What is needed is a method for treating a contoured titanium substrate surface that results in a desirable oxide layer that improves bond performance when an adhesive is applied to the surface.

SUMMARY

According to an aspect of the present disclosure, a method for treating a surface of a contoured titanium substrate used for adhesively bonded engine components is provided. The method includes applying energy from a fiber laser system to a contoured surface of a titanium substrate, the laser energy is distributed to the contoured titanium surface by at least one of direct light of sight, reflection, or scattering of one or more laser beam.

According to another aspect of the present disclosure, a method of adhering a titanium substrate to a second substrate is provided. The method includes: a) applying energy from a fiber laser system to a surface of a titanium substrate in an amount that creates a produced oxide layer within the titanium substrate, the produced oxide layer having a nanoscale open porous morphology; b) applying one or more adhesives to at least a portion of the produced oxide layer in a manner that causes the adhesive to infiltrate the nanoscale open porous morphology of the produced oxide layer; and c) bonding the second substrate to the portion of the oxide layer having the nanoscale open porous morphology with the one or more adhesives.

According to another aspect of the present disclosure, a method of preparing an airfoil for bonding, the airfoil having a leading edge and a trailing edge. The method includes: a) applying energy from a fiber laser system to a surface of a titanium insert in an amount that creates a produced oxide layer within the titanium insert, the produced oxide layer having an open porous morphology within a nanoscale porous structure; b) applying one or more adhesives to at least a portion of the produced oxide layer in a manner that causes the adhesive to infiltrate the nanoscale porous structure of the produced oxide layer; and c) bonding the surface of the titanium insert with the applied one or more adhesives to the airfoil at the leading edge of the airfoil with the one or more adhesives.

In any of the aspects or embodiments described above and herein, the step of applying energy from the fiber laser system to the contoured surface of the titanium substrate creates a produced oxide layer within the titanium substrate, the produced oxide layer including a nanoscale open porous morphology.

In any of the aspects or embodiments described above and herein, the energy applied from the fiber laser system to the surface of the titanium substrate to create the produced oxide layer may also remove one or more contaminants present on the surface of the titanium substrate.

In any of the aspects or embodiments described above and herein, the energy applied from the fiber laser system to the surface of the titanium substrate to create the produced oxide layer may also remove a natural oxide layer present on the surface of the titanium substrate.

In any of the aspects or embodiments described above and herein, the method may further include applying energy from the fiber laser system to the surface of the titanium substrate in an amount that removes a preexisting oxide layer, the removal of the preexisting oxide layer occurring prior to the creation of the produced oxide layer.

In any of the aspects or embodiments described above and herein, the produced oxide layer may be a layer of a titanium oxide having a thickness on the order of about 5 nanometers (nm) to about 5000 nm.

In any of the aspects or embodiments described above and herein, the thickness of the produced oxide layer may be on the order of about 100 nm to about 500 nm In any of the aspects or embodiments described above and herein, the open porous morphology of the produced oxide layer may be configured to permit an adhesive to infiltrate and reside within at least a portion of the produced oxide layer.

In any of the aspects or embodiments described above and herein, the produced oxide layer may be configured such that the nanoscale open porous morphology is substantially accessible from an exposed surface of the produced oxide layer.

In any of the aspects or embodiments described above and herein, the nanoscale porous structures may be present throughout an entirety of a thickness of the produced oxide layer.

In any of the aspects or embodiments described above and herein, the energy from the fiber laser system may be applied to the surface of the titanium substrate in a manner that causes the energy to reflect and scatter into non-line of sight surface features.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

DETAILED DESCRIPTION

Figure 1:
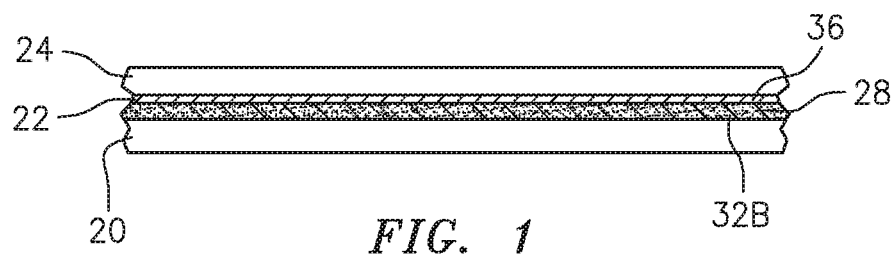
FIG. 1 diagrammatically illustrates a titanium substrate bonded to a second substrate.

Referring to FIG. 1, embodiments of the present disclosure include methods for treating the surface of a titanium substrate 20 to produce a surface that promotes bonding of the surface with an adhesive material 22 such as a primer or adhesive. The aforesaid adhesive 22 provides at least part of a material that will enable the titanium substrate 20 to be joined with a second substrate 24 (e.g., a metallic substrate, a composite substrate, etc.). The surface of the titanium substrate 20 to be joined (e.g., via an adhesive bond) to the second substrate 24 will be referred to hereinafter as a "prebond surface 36". The present disclosure is not limited to treating the prebond surface 36 of any particular type of titanium substrate 20. Unless indicated otherwise herein, the term "titanium" as used herein includes any type of titanium alloy, and is not therefore limited to any particular titanium alloy. The present disclosure is also not limited to treating the surface of a titanium substrate 20 for use with any particular adhesive. Depending upon the type of substrate bonding desired, the adhesive may be a primer or an adhesive, or any material that is useful in producing an adhesive bond, and may include combinations of such materials.

Figure 2:
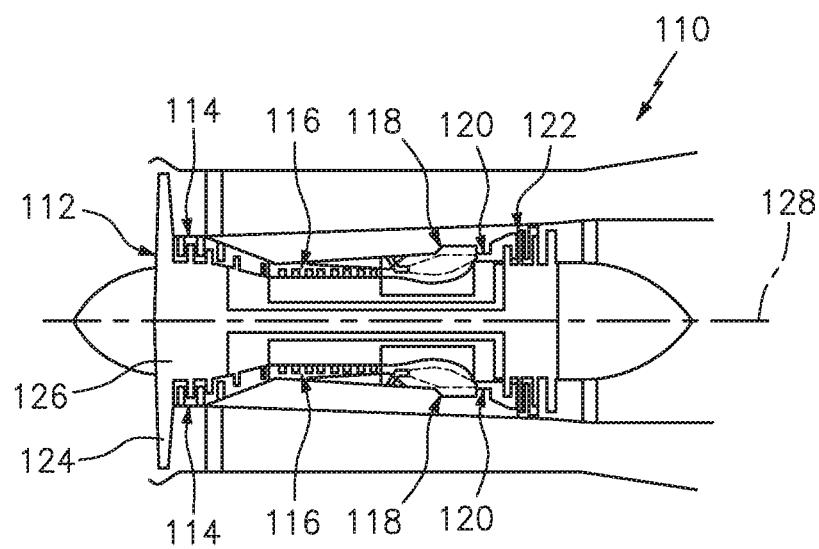
FIG. 2 diagrammatically illustrates a gas turbine engine.
Figure 3:
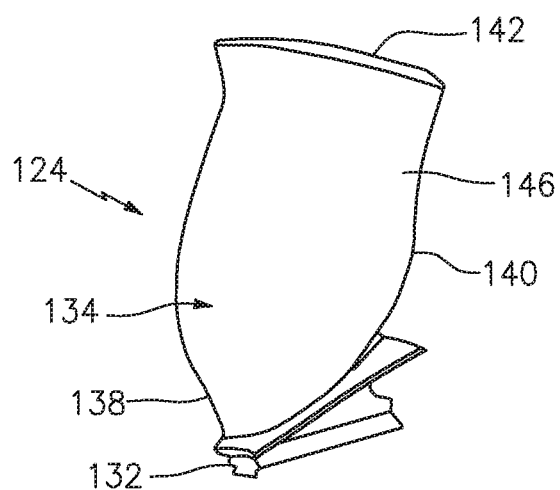
FIG. 3 diagrammatically illustrates a gas turbine engine fan blade.
Figure 3A:
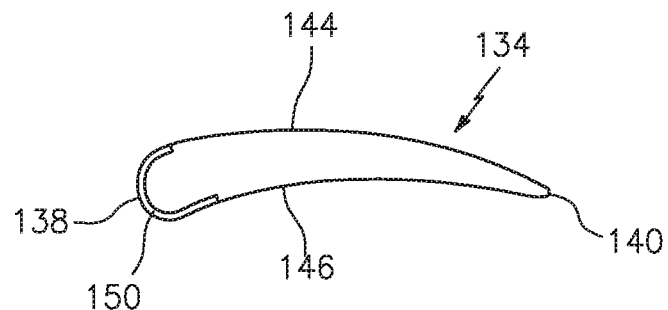
FIG. 3A diagrammatically illustrates a cross-section of a fan blade airfoil.

The present disclosure methods have particular utility is treating components that may be used in a gas turbine engine, but are not limited to treating gas turbine engine components. FIG. 2 illustrates a gas turbine engine 110 including a fan section 112, a low-pressure compressor section 114, a high-pressure compressor section 116, a combustor section 118, a high-pressure turbine section 120, and a low-pressure turbine section 122. Air drawn into the fan section 112 is directed into the compressor sections 114, 116 where it is worked to a higher pressure. The worked air subsequently passes through the combustor section 118 where fuel is added and ignited. The worked air and combustion products enter and power the turbine sections 120, 122 before exiting the engine. The fan section 112 includes a plurality of fan blades 124 connected to, and radially extending out from, a fan hub 126. The fan section 112 is rotatable about centerline 128 of the engine. FIG. 3 illustrates an exemplary fan blade 124 having a root 132 and an airfoil 134. FIG. 3A illustrates a diagrammatic cross-section of a fan blade airfoil 34. The airfoil 134 is defined by a leading edge 138, a trailing edge 140, a tip 142, a suction side surface 144, and a pressure side surface 146. As can be seen in FIG. 3A, in some instances an insert 150 (referred to as "a leading edge insert") may be attached to the airfoil 134 at the leading edge 138 of the fan blade 124. The leading edge insert 150 is a non-limiting example of a titanium substrate that may be treated according to present disclosure methods. As stated above, however, the present disclosure is not limited to treating airfoil leading edge inserts and the insert 150 is described herein solely for the purpose of providing an example that illustrates the utility of the present disclosure; e.g., an application where the titanium substrate may be subjected to significant forces and environmental factors, and how the enhanced bond quality and durability the bond performance made possible by the present disclosure method improves such applications.

Figure 4:
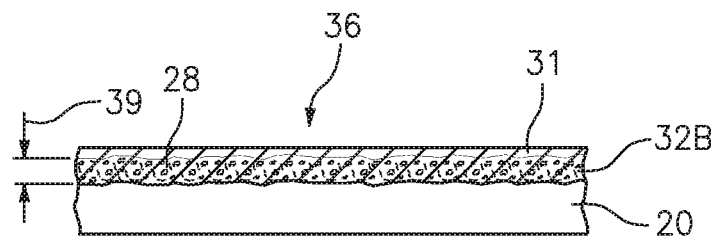
FIG. 4 diagrammatically illustrates a substrate having a produced oxide layer having an open porous morphology with an adhesive residing within the open porous morphology.

Embodiments of the present disclosure utilize a fiber laser system 26 to treat a surface of a titanium substrate 20 in a manner that produces an oxide layer 32B ("produced oxide layer 32B") with an open porous morphology 28. FIG. 4 is a diagrammatic illustration showing a prebond surface 36 of a titanium substrate 20 with a produced oxide layer 32B. An adhesive 31 is shown residing within an open porous morphology of the produced oxide layer 32B, with some amount of the adhesive 31 disposed at or above the exposed surface of the oxide layer 32B. FIG. 4 is purposefully shown not to scale to facilitate the description provided herein. There are numerous different types of fiber laser systems 26 commercially produced. Moreover, any particular fiber laser system 26 may be operated using a variety of different parameters including but not limited to beam size, laser power, laser frequency, scan speed, pulse rate/duration, etc. Hence, the present disclosure is not limited to any particular type of fiber laser system 26 or operating parameters provided the aforesaid system is operated to produce an oxide layer 32B with an open porous morphology 28 as described herein. A non-limiting example of a fiber laser system 26 that may be used with a titanium substrate is an infrared fiber laser system that is operable to produce pulse energy in the range of about 0.2 to 1.0 mJ and can operate at a pitch of about 0.01 to 0.03 mm, using a laser beam having a diameter of about 40 Fiber lasers capable of ablating and treating the titanium surface may be supplied by TRUMPF, Rofin-Sinar, Advalue Photonics, Coherent, IPG Photonics, FOBA and others. A specific example of an acceptable fiber laser system is a 50 watt pulsed fiber laser, vertical configuration produced by the IPG Photonics Corporation of Oxford, Mass. USA, with a focal length of 254 mm.

Referring to FIGS. 5-8, the fiber laser system 26 may be configured to move the laser output (i.e., the "laser beam 30") relative to a stationary substrate 20, or alternatively the system 26 may be configured to move the substrate relative to a stationary laser beam, or some combination thereof. The relative movement between the laser beam 30 and the substrate 20 may follow a predetermined pattern; e.g., a two dimensional pattern or a three-dimensional pattern, etc. The present disclosure is not limited to any particular application methodology other than as indicated herein.

Figure 5:
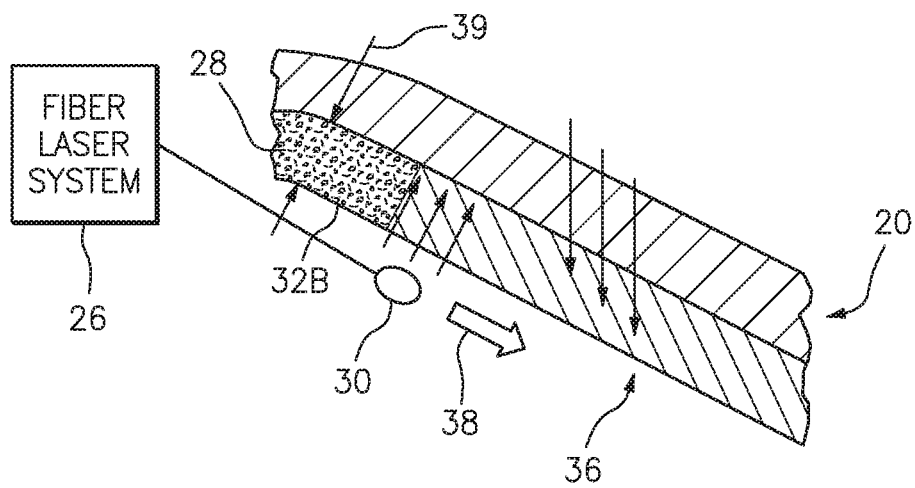
FIG. 5 diagrammatically illustrates a surface preparation process utilizing a fiber laser system having a single laser beam.
Figure 6:
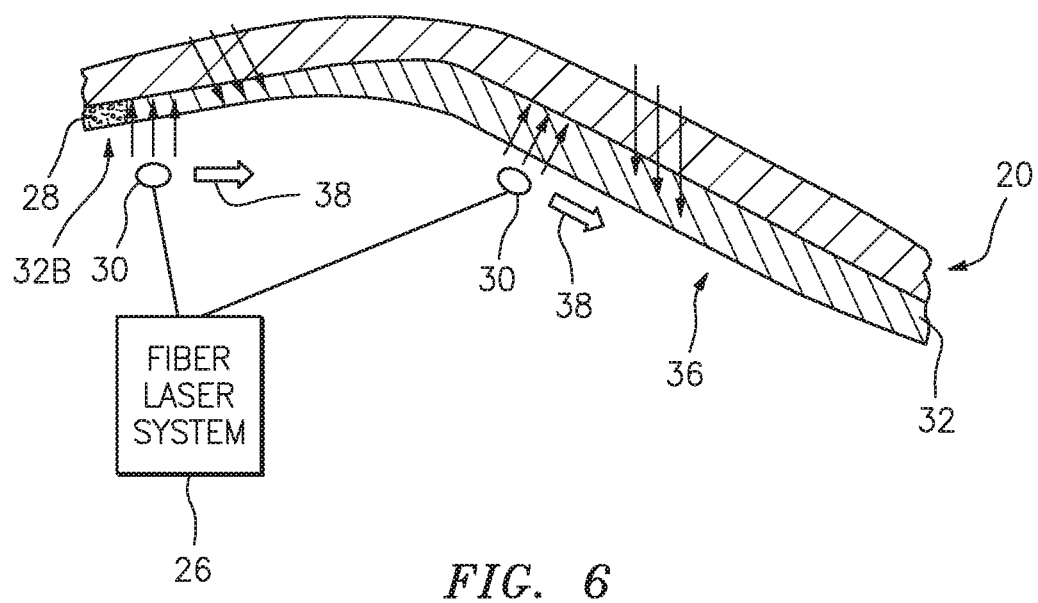
FIG. 6 diagrammatically illustrates a surface preparation process utilizing a fiber laser system having a plurality of laser beams.

In some embodiments, the present disclosure may utilize a fiber laser system 26 that employs a single laser beam 30 to treat a surface of a titanium substrate 20 in a manner that produces an oxide layer 32B with an open porous morphology 28; e.g., see FIG. 5. In other embodiments, the present disclosure may utilize a fiber laser system 26 that employs a plurality of laser beams 30 to treat a surface of a titanium substrate 20 in a manner that produces an oxide layer 32B with an open porous morphology 28; e.g., see FIG. 6.

As stated above, a titanium substrate 20 present within an environment containing oxygen (e.g., an "air" environment) will typically have a preexisting oxide layer 32A formed naturally on the prebond surface 36 of the titanium substrate 20 (see FIGS. 10, 11); i.e., an oxide layer 32 formed solely by exposure of the titanium substrate 20 to an air environment. In many instances, the aforesaid preexisting oxide layer 32A is a solid layer and its bond to the underlying substrate 20 and/or adhesive 31 may lack significant bonding strength. For at least these reasons, it has been discovered that the preexisting oxide layer 32A may not provide a desirable surface for adhesive bonding. In many instances, the aforesaid prebond surface 36 may also have some amount of contaminants (e.g., dirt, oils, etc.) disposed on the prebond surface 36. These contaminants (which may collectively be referred to as a contaminant layer 34) may detrimentally affect the attachment/bonding of an adhesive to the substrate surface.

In some embodiments of the present disclosure, a fiber laser system 26 may be utilized to introduce energy into a prebond surface 36 of a titanium substrate 20 in an amount that is sufficient to remove the contaminant layer 34 from the prebond surface 36; e.g., remove materials residing on the prebond surface 36 other than the substrate material itself, or a preexisting oxide layer 32A formed on the prebond surface 36. Contaminants present on the prebond surface 36 may, however, be removed by other means. In some embodiments of the present disclosure, a fiber laser system 26 may be utilized to introduce energy into the metallic prebond surface 36 in an amount that is sufficient to remove (e.g., by ablation) the preexisting oxide layer 32A. In some embodiments, the preexisting oxide layer 32A present on the prebond surface 36 may, however, be removed by other means.

Once the preexisting oxide layer 32A is removed (and contaminant layer 34 as applicable), a fiber laser system 26 may be utilized to introduce energy into the prebond surface 36 in an amount that is sufficient to transform a depth of the prebond surface 36 of the substrate 20 into a produced oxide layer 32B having an open porous morphology 28 that is contiguous with the exposed surface of the prebond surface 36 (e.g., See FIG. 4). The produced oxide layer 32B is a layer of a titanium oxide (e.g., a $TiO_x$ layer) having a thickness 39 on the order of about 5 nanometers (nm) to about 5000 nm, which thickness 39 is more typically in the range of about 100 nm to about 500 nm. For clarity sake, the thickness 39 of the produced oxide layer 32B may be determined along a line perpendicular to the prebond surface 36 extending into the underlying titanium substrate 20, and the thickness 39 of the layer 32B is the distance the layer 32B is present along that line at a given point from the exposed surface of the produced oxide layer 32B inward toward the underlying titanium substrate 20.

The term "open porous morphology" is used to indicate that the produced oxide layer 32B has open pores configured to permit an adhesive 31 (See FIG. 4) applied to the exposed surface of the oxide layer 32B to infiltrate and reside within the aforesaid surface. The open pores may be randomly distributed within the oxide layer 32B and are configured to be substantially accessible from the exposed surface of the oxide layer 32B; i.e., substantially accessible such that the adhesive 31 applied to the surface is able to infiltrate and reside within the aforesaid nanoscale open pores. The nanoscale open pores are present in at least a portion of the thickness 39 of the oxide layer 32B extending from the exposed surface of the layer 32B, and may be present in substantially the entire thickness 39 of the layer 32B.

The present disclosure method can be applied to contoured titanium components; i.e., applied to a component surface having at least one portion that is contoured with one or more geometric features that prevent direct line of sight laser beam impingement. A substantial percentage of the incident light in a laser treatment process is either scattered or reflected. Under conventional surface laser treatments, the scattered and/or reflected laser light adds minimal or no energy to the substrate impinged upon. It is typical, for example, for 60-70% of laser light incident to a titanium alloy to be either scattered or reflected. Fiber lasers are known to produce a higher quality beam relative to other laser types, consequently providing a more accurately controlled focal beam relative to other types of laser systems given the same surface morphology. In those instances where a substrate portion is accessible by a line of sight ("LOS") laser beam, as specific geometry features (e.g., the inner surface of v-notch, cylinder, or cavity, etc.) permit, the aforesaid scattering and/or reflection is taken into account under the present disclosure to arrive at the energy necessary to create an oxide layer 32 with the desired open porous morphology 28; e.g., the amount of incident laser light and energy attendant thereto may be increased to account for the reflection and/or scattering.

Figure 7:
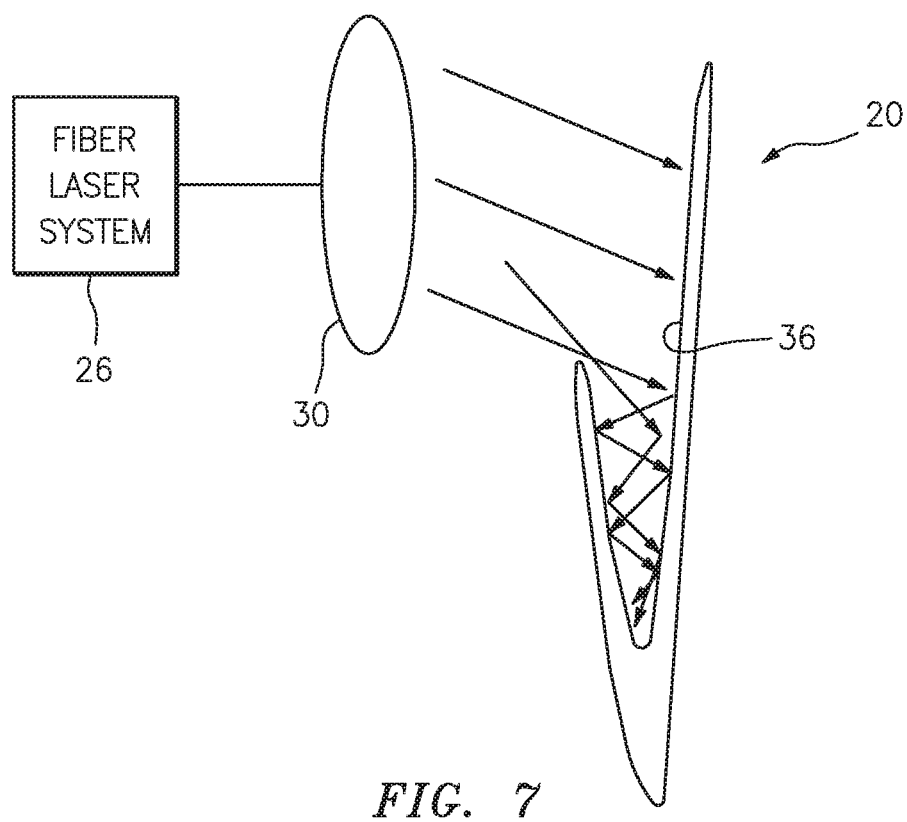
FIG. 7 diagrammatically illustrates a fiber laser system application process embodiment providing reflected and/or scattered light into a non-line of sight surface feature.
Figure 8:
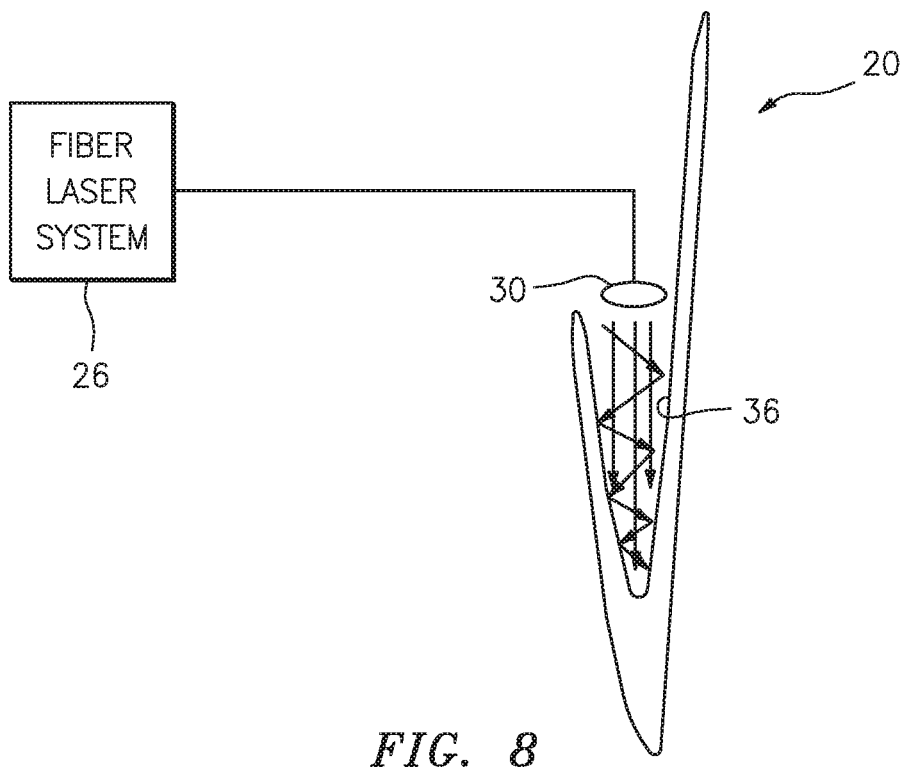
FIG. 8 diagrammatically illustrates a fiber laser system application process embodiment providing reflected and/or scattered light into a non-line of sight surface feature.

LOS laser systems are often limited by their LOS nature. For example, in some instances a portion of a non-planar substrate 20 (e.g., a contoured substrate) may not be accessible by the laser beam produced by a LOS laser system. FIGS. 7 and 8 diagrammatically illustrate a substrate 20 having a V-notch type of feature that is not accessible via a laser system that utilizes a LOS laser beam.

The present disclosure, in contrast, utilizes a fiber laser and leverages the aforesaid scattering and/or reflection to apply the requisite energy into the surface regions that cannot be accessed by a non-LOS laser system; e.g., to remove contaminants 34, to remove a preexisting solid oxide layer 32A, to create a produced oxide layer 32B having an open porous morphology 28, and/or combinations thereof.

For example, under the present disclosure the angle of incidence of the laser beam produced by the fiber laser system 26 may be altered to increase the reflected light energy into a non-LOS substrate surface region (i.e., a "non-LOS surface feature"). The present disclosure further leverages the quality of the laser beam produced by a fiber laser system 26. As stated above, fiber lasers are known to produce one of the highest beam qualities of available laser systems. The flexibility of a fiber laser to alter the angle of incidence of the laser beam permits the laser beam to be applied at an angle wherein the reflected portion of the laser beam will enter further into the non-LOS substrate surface region. The quality of the laser beam produced by the laser fiber system 26 increases the amount of energy that may be provided to the surface via reflectance and scattering. The surface characteristics of the prebond surface 36 (e.g., roughness, etc.) may affect the scattering and/or reflectance of the laser beam. Consequently, the present disclosure contemplates configuring the laser fiber system 26 output in view thereof; e.g., adjusting the output power of the system to produce the requisite reflected laser beam having sufficient power for the treatment described herein. FIGS. 7 and 8 diagrammatically illustrate a substrate having a V-notch type of feature that is not accessible via a LOS impingement process. In FIG. 7, the angle of incidence of the laser beam 30 is altered relative to line perpendicular to one of the substrate 20 surfaces. As a result, an increased amount of energy from the laser beam 30 is reflected into the V-notch and is available therefore for the oxide layer treatment. In FIG. 8, the laser beam 30 is manipulated relative to the V-notch (or vice versa) so that the laser beam 30 is directed into the V-notch. In this example, the geometry of the V-notch relative to the angle of incidence of the laser beam 30 results in an increase in the amount of light reflected and/or scattered within the interior of the V-notch. As a result, the interior surfaces of the V-notch are subjected to an increased amount of energy from the laser beam 30 for the surface treatment.

Figure 9:
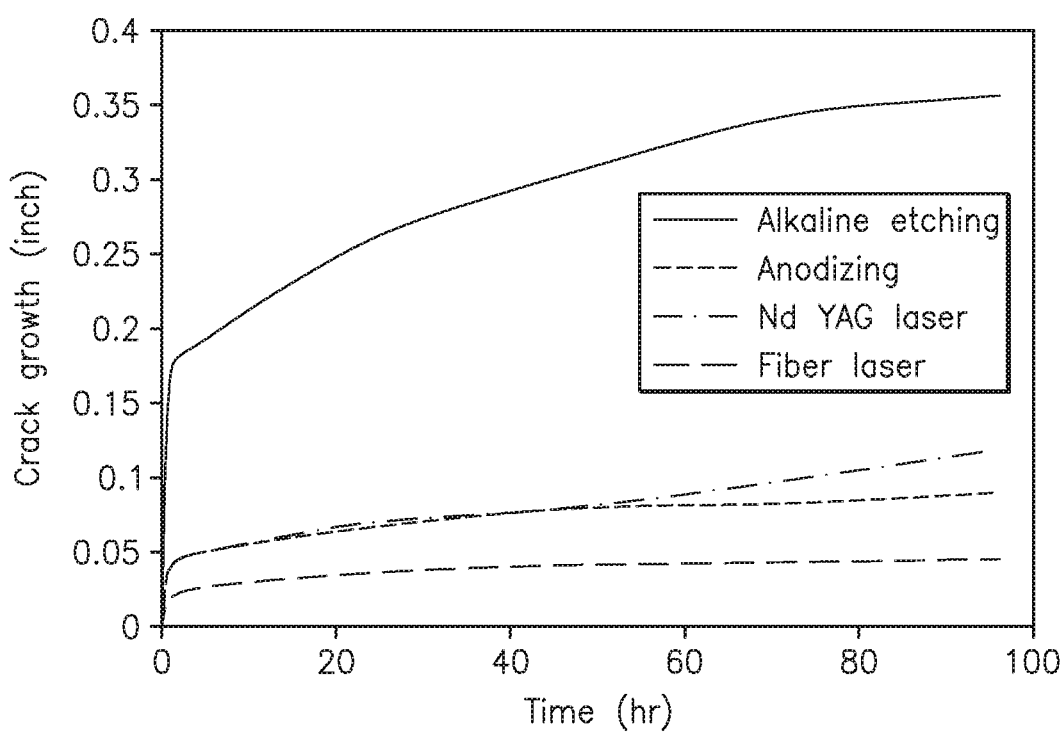
FIG. 9 is a diagrammatic graph of crack growth versus time test data collected for a plurality of different surface preparation techniques to illustrate relative performance.

Testing to evaluate bond performance and cracking resistance was performed to evaluate several surface preparation techniques; e.g., surface preparation by an alkaline etching process, by an anodizing process, by a Nd YAG laser process, and by a fiber laser process. The graph of Crack Growth versus time shown in FIG. 9 depicts the cracking resistance data collected. The results indicate that surface preparation performed by fiber laser process exhibited better bond performance and crack resistance on a titanium surface relative to the same type of substrate surface subjected to an alkaline etch process, an anodizing process, or a Nd YAG laser process. The aforesaid testing also indicated that a desirable failure mode (e.g., 100% cohesive) was achieved as well. The aforesaid tested was performed in accordance with ASTM D3762, except that titanium test samples were used. Surface characterization showed that both macro-roughness and micro-roughness observed with the fiber laser treated titanium surface. A thick open porous morphology oxide layer 32 (e.g., about 100 to 500 nm) was also formed that promotes desirable strong chemical interaction and mechanical interlocking to enhance adhesive bonding. In some isolated areas, a thick porous oxide layer (e.g., about 1500 to 2000 nm) was also observed.

The following examples are provided to illustrate the utility of the present disclosure. The non-limiting examples illustrate method embodiments of the present disclosure applied to a prebond surface 36 of a titanium alloy substrate having a layer of contaminants and a preexisting oxide layer 32A disposed on the aforesaid prebond surface 36. The following examples are also described in terms of one or more laser beam sources from a fiber laser system 26 that are configured to traverse across the prebond surface 36 in the direction indicated by arrow 38 (or vice versa). As indicated above, the present disclosure is not limited to any particular laser application pattern relative to the prebond surface 36.

Figure 10:
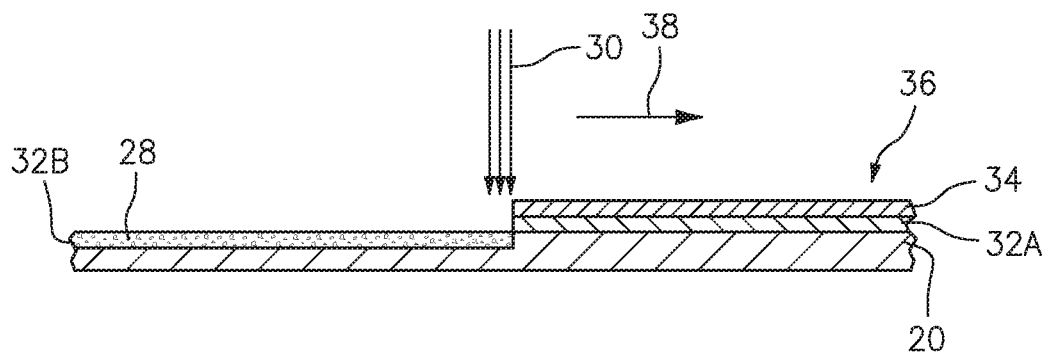
FIG. 10 diagrammatically illustrates an embodiment of the present disclosure wherein a fiber laser system is treating a surface of a titanium substrate.

In a first example shown in FIG. 10, the fiber laser system 26 includes a laser beam source 30 that is configured to introduce energy into the prebond surface 36 in an amount that is sufficient to remove contaminants 34 from the prebond surface 36, to remove the preexisting oxide layer 32A present on the prebond surface 36, and to transform a predetermined depth of the prebond surface 36 into a produced oxide layer 32B having an open porous morphology 28.

Figure 11:
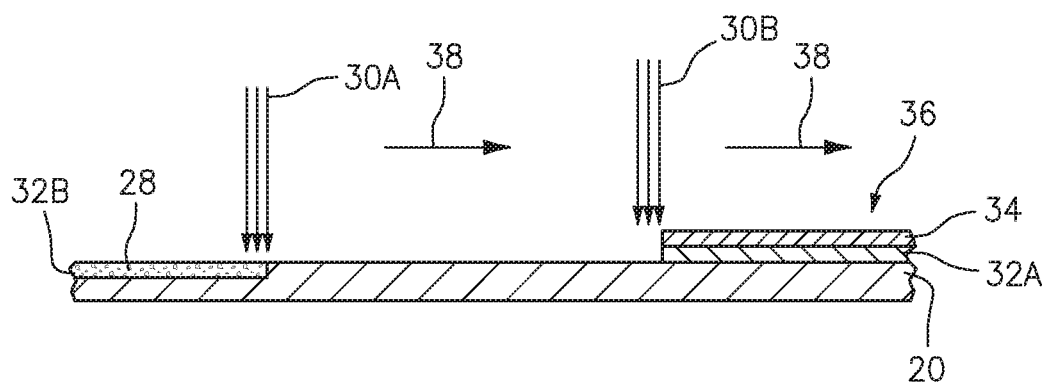
FIG. 11 diagrammatically illustrates an embodiment of the present disclosure wherein a fiber laser system is treating a surface of a titanium substrate.

In a second example shown in FIG. 11, the fiber laser system 26 includes a first laser beam source 30A and a second laser beam source 30B. The first laser beam source 30A is configured to introduce energy into the prebond surface 36 in an amount that is sufficient to remove contaminants 34 from the prebond surface 36 and to remove the preexisting oxide layer 32A present on the prebond surface 36. The second laser beam source 30B is configured to introduce energy into the prebond surface 36 in an amount that is sufficient to transform a predetermined depth of the prebond surface 36 into a produced oxide layer 32B having an open porous morphology 28.

The above examples are intended to be illustrative of some embodiments of the present disclosure, and the present disclosure is not limited to these examples. As stated above, in some embodiments the fiber laser system 26 may employ more than one laser beam source 30 to accomplish certain functionalities (e.g., remove contaminants, remove preexisting oxide layer, form an open porous morphology 28, etc.). Furthermore, as described above the present disclosure provides improved methodologies for treating contoured surfaces having one or more non-LOS surface features. As can be seen in FIGS. 3 and 4, embodiments of the present disclosure utilize the fiber laser system 26 in novel and unique ways to introduce laser energy into non-LOS surface features. The above method examples are applicable to treating prebond surfaces 36 within non-LOS surface features.

As used in this specification and the appended claims, the singular forms "a," "an," and "the" include plural forms thereof unless the context clearly indicates otherwise. Unless otherwise indicated, all numbers expressing conditions, concentrations, dimensions, and so forth used in the specification and claims are to be understood as being modified in all instances by the term "about".

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially. Therefore, the particular order of the steps set forth in the description should not be construed as a limitation.

While various embodiments of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A method for treating a surface of a contoured titanium substrate used for adhesively bonded engine components, comprising:

applying energy from a fiber laser system to a contoured surface of a titanium substrate, the contoured surface including a first surface portion and a second surface portion, the first surface portion and the second surface portion defining at least a portion of a cavity therebetween, the second surface portion being a non-line of sight surface portion with respect to the fiber laser system, the laser energy is distributed to the first surface portion of the contoured titanium surface by at least one of direct line of sight, reflection, or scattering of one or more laser beam;

wherein the step of applying energy from the fiber laser system to the first surface portion of the contoured surface of the titanium substrate creates a produced oxide layer within the titanium substrate at the first surface portion, the produced oxide layer including a nanoscale open porous morphology; and wherein the energy from the fiber laser system is applied to the first surface portion of the contoured surface of the titanium substrate in a manner that causes the energy to reflect onto the second surface portion of the contoured surface so as to create the produced oxide layer within the titanium substrate at the second surface portion.

2. The method of claim 1, wherein the energy applied from the fiber laser system to the contoured surface of the titanium substrate to create the produced oxide layer also removes one or more contaminants present on the surface of the titanium substrate.

3. The method of claim 1, wherein the energy applied from the fiber laser system to the contoured surface of the titanium substrate to create the produced oxide layer also removes a natural oxide layer present on the surface of the titanium substrate.

4. The method of claim 1, further comprising applying energy from the fiber laser system to the contoured surface of the titanium substrate in an amount that removes a preexisting oxide layer, the removal of the preexisting oxide layer occurring prior to the creation of the produced oxide layer.

5. The method of claim 1, wherein the produced oxide layer is a layer of a titanium oxide having a thickness on the order of about 5 nanometers (nm) to about 5000 nm.

6. The method of claim 5, wherein the thickness of the produced oxide layer on the order of about 100 nm to about 500 nm.

7. The method of claim 1, wherein the nanoscale open porous morphology of the produced oxide layer is configured to permit an adhesive to infiltrate and reside within at least a portion of the produced oxide layer.

8. The method of claim of claim 7, wherein the produced oxide layer is configured such that the nanoscale open porous morphology is substantially accessible from an exposed surface of the produced oxide layer.

9. The method of claim 1, wherein the nanoscale open porous morphology is present throughout an entirety of a thickness of the produced oxide layer.

10. A method of adhering a titanium substrate to a second substrate, comprising:

applying energy from a fiber laser system to a surface of a titanium substrate in an amount that creates a produced oxide layer within the titanium substrate, the produced oxide layer having a nanoscale open porous morphology;

applying one or more adhesives to at least a portion of the produced oxide layer in a manner that causes the adhesive to infiltrate the nanoscale open porous morphology of the produced oxide layer; and bonding the second substrate to the portion of the oxide layer having the nanoscale open porous morphology with the one or more adhesives;

wherein the nanoscale open porous morphology is present throughout an entirety of a thickness of the produced oxide layer; and wherein the thickness of the produced oxide layer is a distance the produced oxide layer is present from an exposed surface of the produced oxide layer inward to an underlying portion of the titanium substrate.

11. The method of claim 10, wherein the energy applied from the fiber laser system to the surface of the titanium substrate to create the produced oxide layer also removes a natural oxide layer present on the surface of the titanium substrate.

12. The method of claim 10, further comprising applying energy from the fiber laser system to the surface of the titanium substrate in an amount that removes a preexisting oxide layer, the removal of the preexisting oxide layer occurring prior to the creation of the produced oxide layer.

13. The method of claim 10, wherein the produced oxide layer is a layer of a titanium oxide and wherein the thickness on the order of about 5 nanometers (nm) to about 5000 nm.

14. The method of claim 10, wherein the nanoscale porous morphology of the produced oxide layer is configured to permit the one or more adhesives to infiltrate and reside within at least a portion of the produced oxide layer.

15. The method of claim 14, wherein the produced oxide layer is configured such that the nanoscale open porous morphology is substantially accessible from an exposed surface of the produced oxide layer.

16. A method of preparing an airfoil for bonding, the airfoil having a leading edge and a trailing edge, the airfoil further having a convex suction side surface and a concave pressure side surface, each of the convex suction side surface and the concave pressure side surface extending from the leading edge to the trailing edge, the method comprising:

applying energy from a fiber laser system to a surface of a titanium insert in an amount that creates a produced oxide layer within the titanium insert, the produced oxide layer having an open porous morphology within a nanoscale porous structure;

applying one or more adhesives to at least a portion of the produced oxide layer in a manner that causes the adhesive to infiltrate the nanoscale porous structure of the produced oxide layer; and bonding the surface of the titanium insert with the applied one or more adhesives to the airfoil at the leading edge of the airfoil with the one or more adhesives.

17. The method of claim 16, wherein the produced oxide layer of the titanium insert is a layer of a titanium oxide having a thickness in the range of about 5 nanometers (nm) to about 5000 nm.

18. The method of claim 17, wherein the thickness of the produced oxide layer is in the range of about 100 nm to about 500 nm.

19. The method of claim 16, wherein the open porous morphology of the produced oxide layer is configured to permit the one or more adhesives to infiltrate and reside within at least a portion of the produced oxide layer.

20. The method of claim 18, wherein the produced oxide layer is configured such that the open porous morphology is substantially accessible from an exposed surface of the produced oxide layer.

* * * * *